Patented Jan. 14, 1947

2,414,289

UNITED STATES PATENT OFFICE 2,414,289

CONDENSATION PRODUCTS OF MELAMINES AND SUBSTITUTED MELAMINES WITH ALKYLENE OXIDES

Walter P. Ericks, Buffalo, N. Y., assignor to American Cyanamid Company, New York, N. Y., a corporation of Maine No Drawing. Original application January 17, 1941, Serial No. 374,834. Divided and this application December 24, 1943, Serial No. 515,609

7 Claims. (Cl. 260—2)

This invention relates to the preparation of new and useful reaction products of triazines and substituted triazines with alkylene oxides.

More particularly, it embraces the preparation of reaction products by reacting triazines such as melamine and substitution and polymerization products thereof with alkylene oxides such as ethylene oxide, glycidol or compounds capable of yielding an alkylene oxide-containing substance during the condensation reaction. This case is a division of my co-pending application, Ser. No. 374,834, filed Jan. 17, 1941, now Patent No. 2,381,121.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, Fabrikoid and similar materials and are particularly valuable when used as alkali and acid resistant wetting, detergent and emulsifying agents, as well as for the resolution of emulsions such as petroleum emulsions. They also find use as mercerizing assistants. Further and more important uses are suggested in the following description.

With these objects in view and such others as may hereinafter appear, the invention consists in the novel products and processes described below and more particularly defined in the claims.

The necessary reactants are mixed together with a diluent or as alternatively described with a portion of a recycled liquid reaction product. The product is then obtained by evaporation of the diluent.

The compounds of this invention are prepared in general by reacting a triazine, substituted or unsubstituted with a compound containing an ethylene oxide ring. If desired the reaction is accelerated by using a temperature of 150 to 200° C. and a suitable organic or inorganic base, preferably an alkali-metal or alkaline earth metal hydroxide, such as sodium hydroxide, potassium hydroxide, and calcium hydroxide, or pyridine, and the like. Usually the reaction is exothermic and hence must be controlled as by the use of an efficient cooling device. The reaction product is then filtered off, washed and dried on a steam bath. If desired, complete condensation of the reactants is not effected. Instead, the reaction is temporarily arrested and completed only after the product, resinous or waxy or in emulsion form, is applied to a cloth and the latter heated or passed over a hot roller. In place of an alkylene oxide containing compound, an epihalogen-hydrin may be used, or a similar substance which has an alkylene oxide group or a group which under the conditions of the reaction forms an intermediate having an alkylene oxide group.

The following examples illustrate the invention in more detail:

Example I 6.3 g. of melamine (0.05 mol.) and 11.1 g. of glycidol (0.15 mol.) were heated slowly with stirring to 130° C. whereupon the external heating was discontinued. The stirring was continued and the temperature rose slowly to 140° C. At this temperature a sudden reaction took place and even after the beaker was placed in ice water, the temperature of the reaction medium rose to 220° C. The product was a non-transparent soft resin, soluble in hot water, from which a precipitate (probably unreacted melamine) was obtained on cooling. Upon heating the resinous product to 250° C. it assumed an amber color, became viscous and was soluble in both hot and cold water.

Example II 1.26 g. of melamine (0.01 mol.) and 7.4 g. of glycidol (0.1 mol.) were heated slowly with constant stirring to 140° C. Even after the reaction mixture and its container were placed into cold water, the reaction temperature rose continuously to 220° C. The product was an amber colored, transparent, very viscous resin which was readily soluble in hot water.

Example III

Octadecoxy propylamine hydrochloride was prepared by reacting octadecoxy primary amine with an equimolecular quantity of hydrochloric acid in ethyl alcohol and subsequently filtering off the product obtained.

18.2 g. of octadecoxypropylamine hydrochloride (0.05 mol.) and 3.15 g. of melamine (0.025 mol.) were heated at 200 to 210° C. for 3 hours. The brown colored product obtained was allowed to cool, and then ground and digested in warm water containing an excess of ammonia. The resultant slurry was cooled in an ice bath, filtered, the filter cake was washed with water and digested in hot alcohol containing charcoal. The alcohol extract was filtered and the filtrate was evaporated on a hot plate and subsequently on a steam bath to yield a tan colored wax, solidifying at about 65° C. and weighing about 13 g.

One mol. equivalent of this bis-octadecoxypropyl melamine was reacted in a container with twenty mol. equivalents of glycidol by heating the reactants to 250° C. The product obtained was soluble in cold water and common organic solvents and gave clear foaming solutions. The reaction probably takes place according to the formula:

Bis-octadecoxypropyl melamine + glycidol

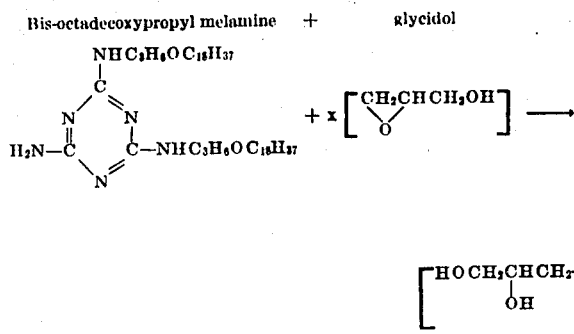

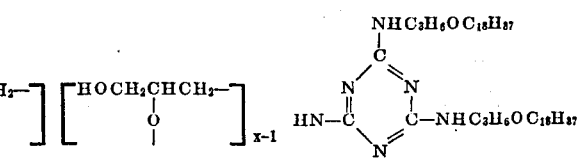

The product was soluble and stable in strong alkaline solutions and exhibited strong wetting properties. It could be used advantageously as a mercerizing assistant.

*Example IV*

In another experiment, 7.46 g. of bis-octadecoxypropyl melamine (0.01 mol.) and 14.8 g. of glycidol (0.2 mol.) were heated to 170° C. when an exothermic reaction occurred, the heating being discontinued, sending the temperature to 220° C. The reaction mixture was cooled to 190° C. and then heated to 190° to 200° C. for 15 minutes to yield a brown wax, easily soluble in hot water and readily dispersible in cold water. The product showed excellent softening properties when applied to cellulosic fabrics, yarn or threads.

*Example V*

6.3 g. of melamine (0.05 mol.) and a plurality of 8.1 g. portions of glycidol (0.15 mol. per portion) up to about two portions (i. e., 16.2 g.) of glycidol were reacted by heating to 155° C. with stirring. At this temperature a rapid rise in temperature occurred and the heating was discontinued, the beaker and its contents being immersed in an ice bath. The temperature of the reaction reached 190° C. and on cooling a white hard resin formed. The product was soluble in hot water, precipitating out upon cooling. This melamine-glycidol condensation product was then heated together with an additional or third 8.1 g. portion of glycidol. At 120° C. an exothermic reaction took place and the temperature rose to 180° C. On cooling a very viscous, opalescent resin was obtained. This resin was readily soluble in hot water without forming a precipitate on cooling. The bottom of the beaker, however, still held a small quantity of unreacted melamine.

This reaction mass was further reacted with a fourth 8.1 g. portion of glycidol. The reaction mixture was stirred and heated to 90° C. at which temperature the application of external heat was discontinued and by continuing the stirring of the mixture, the temperature was maintained at 90° C. for about 15 minutes because of the exothermic reaction which set in. When the temperature began to drop, a small quantity (about 5 cc.) of water was added, the mixture was heated to 140° C. and then allowed to cool. A pale yellow, viscous resin was obtained, readily soluble in water.

In addition to ethylene oxide and glycidol, various other ethylene oxide ring compounds may be used, namely propylene oxide, isobutylene oxide, tetramethylene oxide, n-hexyl-ethylene oxide and epichlorhydrin as well as compounds which are capable of forming an ethylene oxide ring under the conditions of the reaction as, for example, ethylene chlorhydrin, chloroglycerol and the like.

Various alkylene oxides or alkylene oxide containing compounds may be used. However, if the compound chosen for the reaction with a triazine has a low boiling point, i. e. ethylene oxide, propylene oxide, and the like, it is advantageous to carry out the reaction in a closed system and under elevated pressure in order to raise the temperature of the reaction to a point at which the reaction proceeds at a sufficiently rapid rate to make the process commercially feasible.

These reaction products of compounds containing an ethylene oxide ring and a triazine or a substituted triazine are of particular utility in the formation of surface-active agents of the cation-active type. For this reason they are well suited for wetting and softening wool, cotton, cellulose acetate, cellulose nitrate, viscose and similar materials. They are also useful in the emulsification of mineral oils, glycerides, fats, oils and the like. They find application in the formulation of printing inks, dye pastes, dye baths, leather preparations and flotation agents. By their use it is possible to secure fullness, resistance to unraveling, and increased wet strength in rayons and other fabrics. They reduce the tendency of treated cloth materials to wrinkle or crease.

These products, particularly those having waxy or paste-like properties are useful assistants in the textile, leather, paper, rubber, lacquer and similar industries. In many of the examples, particularly when polyamines are incorporated, or when temperatures are not carefully regulated, mixtures result containing several different substances. When used as textile assistants or in leather and similar processing industries it is not necessary to isolate the desired products; instead, the mixtures can be used directly.

The products described herein may be further reacted with an amine, either primary or secondary, or with a fatty acid to yield highly desirable and useful surface-active compounds.

In addition to the triazines above mentioned various others may be reacted with the alkylene oxides. Among such compounds may be specifically cited cyanuric chloride, its substitution products such as cyanuric acid for polymerization products of these triazines such as melam, melem, melon, hydromelonic acid, and the like. Further examples of substituted melamines include mono-, di-, and tri-laurylmelamine, mono-, di-, and tri-octadecylmelamine, benzyl melamine, mono-, di-, and triphenyl melamine and their isomers, monoformyl melamine, and other monoacyl derivatives, diacetyl melamine, triamino-melamine, hexachloro-triphenyl melamine and other cyanuric chloro-anilides, tri-p-diphenylene-diamino-melamine, tricarbamine melamine, 2,4,6-tri-p-naphthyl melamine and the like.

It is to be understood that the examples are merely specific embodiments and that the invention is not limited thereto, but is to be broadly construed within the scope of the appended claims.

I claim:

1. A condensation product of glycidol and bis-octadecoxypropyl melamine.

2. A condensation product of glycidol and an octadecoxypropyl melamine containing a replaceable hydrogen atom attached to a nitrogen atom.

3. The process for the preparation of condensation products which comprises reacting a member selected from the group consisting of melamine, a hydrocarbon substituted melamine containing from 1 to 3 monovalent hydrocarbon substituents attached to amine nitrogen and an octadecoxypropyl melamine, with a compound containing an alkylene oxide ring.

4. The process for the preparation of condensation products which comprises reacting a member selected from the group consisting of melamine, a hydrocarbon substituted melamine containing from 1 to 3 monovalent hydrocarbon substituents attached to amine nitrogen and an octadecoxypropyl melamine, with a compound containing an ethylene oxide ring.

5. The condensation product of a compound containing an alkylene oxide ring and a member selected from the group consisting of melamine, a hydrocarbon substituted melamine containing from 1 to 3 monovalent hydrocarbon substituents attached to amine nitrogen and an octadecoxypropyl melamine.

6. The condensation product of a compound containing an ethylene oxide ring and a member selected from the group consisting of melamine, a hydrocarbon substituted melamine containing from 1 to 3 monovalent hydrocarbon substituents attached to amine nitrogen and an octadecoxypropyl melamine.

7. The condensation product of glycidol and a member selected from the group consisting of melamine, a hydrocarbon substituted melamine containing from 1 to 3 monovalent hydrocarbon substituents attached to amine nitrogen and an octadecoxypropyl melamine.

WALTER P. ERICKS